United States Patent
Song et al.

[11] Patent Number: 5,991,112
[45] Date of Patent: Nov. 23, 1999

[54] NON-CONTACT SERVOTRACK WRITING WITH PHASE SENSITIVE DETECTION

[75] Inventors: Hubert Song, Sunnyvale; John C. Tsai, Saratoga; Mervyn L. Hopson, Cupertino; Kam-Fung Yan, Mountain View; Jean Chi, San Jose, all of Calif.

[73] Assignee: Excel Precision, Santa Clara, Calif.

[21] Appl. No.: 08/812,998

[22] Filed: Mar. 4, 1997

[51] Int. Cl.⁶ .................................................. G01B 9/02
[52] U.S. Cl. .................................................. 360/75
[58] Field of Search .................. 360/77.03, 75, 360/78.11, 77.02, 77.05, 103

[56] References Cited

U.S. PATENT DOCUMENTS

| | | | |
|---|---|---|---|
| 577,130 | 4/1897 | Baker | 360/75 |
| 4,481,550 | 11/1984 | Miller et al. | 360/77.03 |
| 5,108,184 | 4/1992 | Brown et al. | 360/75 |
| 5,162,955 | 11/1992 | Burdenko | 360/75 |
| 5,227,625 | 7/1993 | Hetzel | 360/75 |
| 5,247,493 | 9/1993 | Kime et al. | 360/103 |
| 5,315,372 | 5/1994 | Tsai | 360/77.03 |
| 5,319,509 | 6/1994 | Micheleson et al. | 360/77.03 |
| 5,325,349 | 6/1994 | Taniguchi | 360/77.03 |
| 5,339,204 | 8/1994 | James et al. | 360/77.03 |
| 5,341,256 | 8/1994 | Murata et al. | 360/75 |
| 5,442,172 | 8/1995 | Chiang et al. | 360/77.03 |
| 5,471,304 | 11/1995 | Wang | 360/77.03 |
| 5,488,519 | 1/1996 | Ishida et al. | 360/77.03 |
| 5,568,337 | 10/1996 | Eguchi et al. | 360/75 |

OTHER PUBLICATIONS

Meyer & Amer, Novel Optical Approach to Atomic Force Microscopy, Sep. 19, 1988, pp. 1045–1047, vol. 53 No. 12, US, Appl. Phys. Lett.

*Primary Examiner*—Naril Hindi
*Attorney, Agent, or Firm*—Hickman Stephens & Coleman, LLP

[57] ABSTRACT

A servotrack writing apparatus (10) for use on computer disk drive workpieces (12). A writer controller (58) puts the writing apparatus (10) in the role of master to direct the workpiece (12) as a slave to position its read-write head (36) and to write the servotracks. A tracking section (54) provides a modulated light beam (72) from which a reflected portion is detected by a bi-cell photo sensor (70) and processed in the writer controller (58) to determine the position of a thru-hole (40) or a detection region (42) in the actuator arm (24) of the workpiece (12). The writer controller (58) may use a lock-in amplifier (102, 104) for the processing the reflected portion of the light beam (72). A reference arm (44) is locked and moved in a synchronous relationship with the actuator arm (24). A measurement section (56) determines the position of the reference arm (44), and may include an interferometer system (122) having a differential head (128) and a differential target (124), to permit increased resolution and nulling of errors. The interferometer system (122) may also use multiple frequency techniques to further increase resolution.

20 Claims, 3 Drawing Sheets

NON-CONTACT SERVOTRACK WRITING WITH PHASE SENSITIVE DETECTION

TECHNICAL FIELD

The present invention relates generally to the fields of laser interferometry and other optical measurement, and more particularly to an improved device and method for accurately positioning servotrack writing heads during the manufacture of dynamic magnetic information storage and retrieval devices commonly known as computer hard disks.

BACKGROUND ART

In the past, to perform servotrack writing in computer disk drives, the readwrite head position in the drive has typically been controlled by a single positioning servo loop using a mechanically engaging push-pin on an external push-pin arm driven by an external VCM. These systems have a number of disadvantages, particularly including mechanical play between the thru-hole and the push-pin.

Alternately, dual servo systems employing both a master and a slave servo system have come into use. In these the slave servo system optically locks the arm of the disk drive bearing the read-write head into a synchronous relationship with a reference arm of the servotrack writing apparatus, and precise measurement of the position of this reference arm is used during the actual writing of servotracks into the media surfaces of the disk drive. In essence, this technique is that taught in U.S. Pat. No. 5,315,372, by one of the present inventors.

Unfortunately, as desired servotrack densities have become very high, say exceeding 8,000 tracks per inch, techniques used for optically locking the drive arm and the reference arm into the synchronous relationship needed has not been able to match the possible resolution of the reference arm position measuring system, which typically uses very precise laser interferometric methods. Thus the highest possible accuracy of servotrack writing has not been achieved.

Further, many reference arm position measuring laser interferometer systems use only a single-beam single-pass type system, and thus are susceptible to repeating and non-repeating master arm pivot eccentricity errors.

Therefore, to progress beyond micro-meter resolution and into the nanometer resolution range in servotrack writing systems, what is needed is improved slave servo system photo sensor sensitivity. Further desirable is concurrent reduction of master servo system eccentricity errors in such servotrack writing systems. The present invention addresses both of these needs, and thereby derives the full potential of servotrack writing systems which employ it.

DISCLOSURE OF INVENTION

Accordingly, it is an object of the present invention to provide a servotrack writing system capable of writing at high servotrack densities.

Another object of the invention is to provide a servotrack writing system using optical position sensing techniques.

Another object of the invention is to provide a servotrack writing system having a disk drive workpiece actuator arm to writing apparatus reference arm synchronizing sub-system which has resolution approaching that of available reference arm position determining sub-systems.

Another object of the invention is to improve the accuracy of the reference arm position measuring system for high track density servotrack writing by reducing measurement error due to eccentricity of the reference arm mechanism.

And, another object of the invention is to provide a smooth, rapid, and dependable system for locking the disk drive workpiece actuator arm and the writing apparatus reference arm into synchronization when performing high density servotrack writing.

Briefly, the preferred embodiment of the present invention is a positioning apparatus for use in servotrack writing during the assembly of computer storage disk drives. The positioning apparatus assumes the role of a master and directs the disk drive as its slave to move an actuator arm inside the disk drive in a locked synchronous relationship with a reference arm of the positioning apparatus. The synchronous relationship is locked into and maintained by using a light beam reflected off of the actuator arm. The position of the reference arm is measured, and feedback techniques are used to precisely position it while the disk drive is instructed to write servotrack information via a read-write head mounted on its actuator arm. No contact occurs between the reference arm and the actuator arm. By using phase sensitive detection to enhance the accuracy with which the synchronous relationship is maintained the resolution of the positioning of the actuator arm is enhanced, and greater density servotracks can be written into the storage media of the disk drive.

An advantage of the present invention is that is capable of providing actuator arm to reference arm synchronization suitable for writing servotracks at densities exceeding 8,000 tracks per inch.

Another advantage of the invention is that both the reference arm measuring sub-system and the actuator arm to reference arm synchronizing sub-system are optical, and accordingly do not suffer from any problems due to mechanical play between contacting parts.

Another advantage of the invention is that its actuator arm to reference arm synchronizing sub-system has resolution which at least approaches that of common reference arm measuring sub-systems. In the past this particular sub-system has been the "bottle-neck" or limiting factor to increasing overall servotrack writing densities with entirely optical measuring systems. Accordingly, while improvement in this sub-system alone increases the possible writing density of servotracks, improvement in other sub-systems in servotrack writing apparatus may now provide even further increase in writing density.

Another advantage of the invention is that it may be used with differential measurement techniques in the reference arm measuring sub-system, thereby reducing some classes of measurement errors by nulling them. One common example of such an error source is eccentricity in the reference arm mechanism. Previously such error had to be tolerated, compensated for, or adjusted out. Using the present invention, all but extreme instances of such eccentricity can now be ignored.

Another advantage of the invention is that it works well with conventional multiple frequency interferometric measurement techniques in the reference arm measuring sub-system, thereby permitting the resolution enhancement which such techniques are capable of to be also realized in servotrack writing apparatus using the present invention.

And, another advantage of the invention is that it may be implemented to provide multiple levels of resolution in the actuator arm to reference arm synchronizing sub-system. This permits rapid and dependable initial locking-on of the actuator arm to the reference arm in one or more coarse modes, then changing to a fine or precision mode for carrying out the actual servotrack writing.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
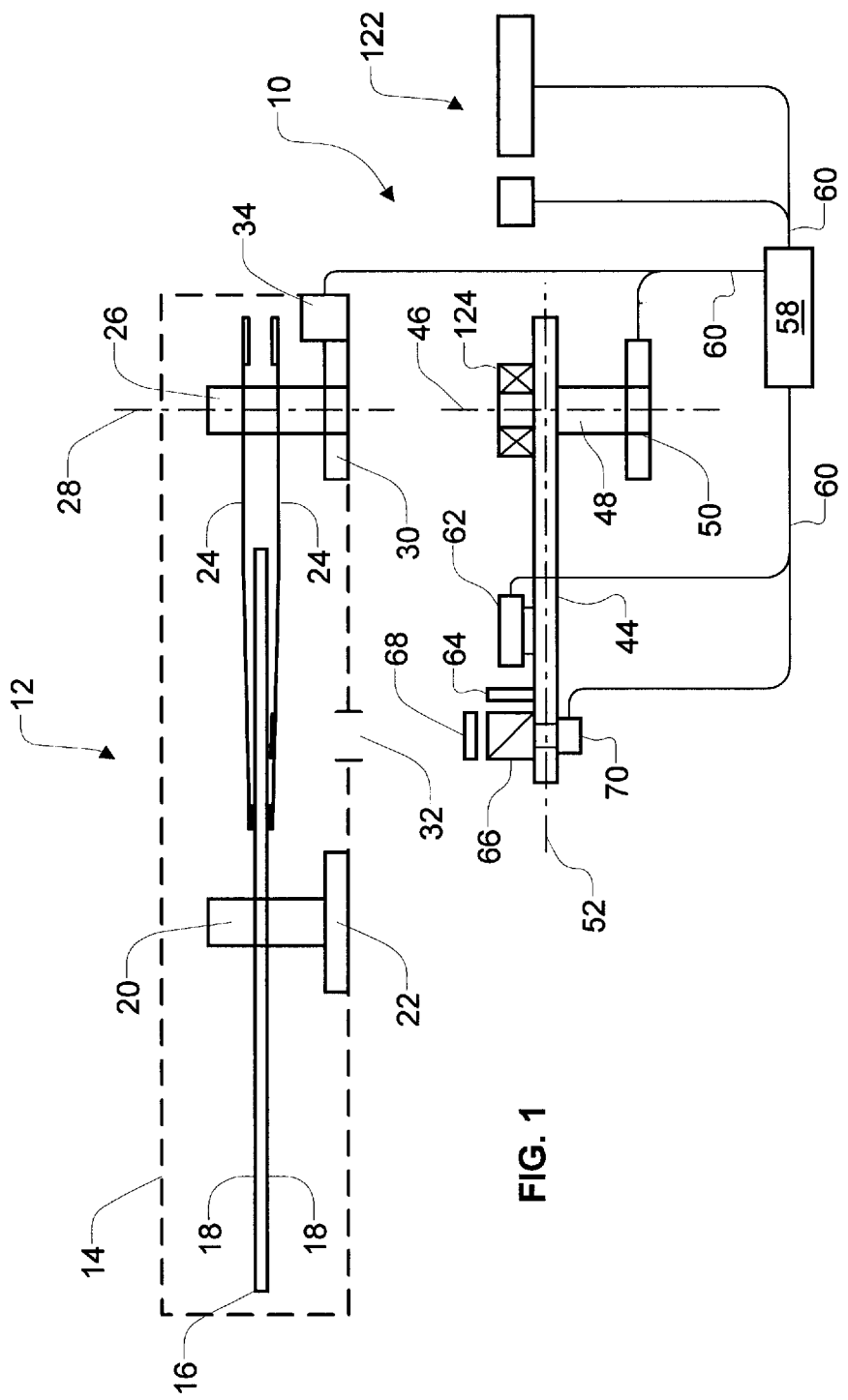
FIG. 1 is a side elevational view of the inventive writing apparatus and a workpiece disk drive.

A preferred embodiment of the present invention is a dual servo loop positioning type servotrack writing apparatus. As illustrated in the various drawings herein, and particularly in the view of FIG. 1, a preferred embodiment of the inventive device is depicted by the general reference character 10. Further, the present invention operates upon a generally conventional computer disk drive workpiece, which is depicted by the general reference character 12.

FIG. 1 illustrates in side elevational view the pertinent components of the computer disk drive workpiece 12. Included is a housing 14 (shown in ghost view), which encompasses the other components of the workpiece 12. Further included is at least one disk plate 16 having two media surfaces 18 upon its major sides. The disk plate 16 is rotated on a spindle shaft 20 by a spindle motor 22. Also provided are actuator arms 24 (one per media surface), mounted upon an actuator shaft 26 which is pivotally moved about an actuator pivot axis 28 by an actuator 30 (e.g. a VCM, Voice Coil Motor, or other suitable means). The housing 14 includes a port 32 for optical access to portions of one actuator arm 24 (in FIG. 1 the lower one). During servotrack writing the port 32 is either temporarily opened, or else optical access is through a transparent covering material. Operation of the workpiece 12 is directed by a workpiece controller 34.

Figure 2:
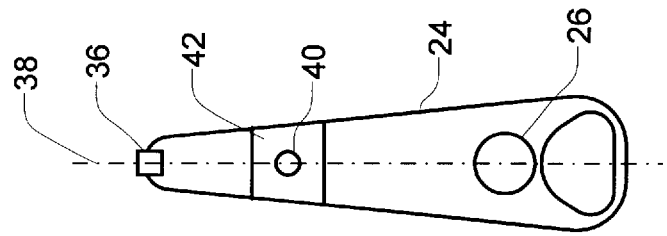
FIG. 2 is a bottom plan view of a typical actuator arm of the workpiece disk drive of FIG. 1.

FIG. 2 is a bottom plan view illustrating particular aspects of a typical actuator arm 24 used in the workpiece 12. A read-write head 36 is located at the longitudinal end of the actuator arm 24, which in an assembled workpiece 12 is that end which is most remote from the actuator shaft 26. An actuator arm axis 38 is defined running generally longitudinally through the actuator arm 24. Typical industry practice is for actuator arms 24 to have a thru-hole 40 provided for use during servotrack writing. For discussion purposes, the region of the actuator arm 24 proximate to the thru-hole 40 (or if one is not present, the region where one would normally be expected) will herein be termed a detection region 42.

Servotracks are written onto one or more of the media surfaces 18 for position reference use during the later writing and reading of datatracks in the workpiece 12. The servotracks (and the datatracks which later follow) are themselves not shown in the figures, since they are quite small and closely spaced.

In current practice, both dedicated and embedded servotrack systems are used. In dedicated systems, one or more media surfaces 18 will contain only the servotracks (for example the lower media surface 18 in FIG. 1), with the other media surfaces 18 available to contain the datatracks (i.e., for eventual user data storage). In embedded systems, which are usually used in disk drives with fewer disk plates 16, the servotracks and the datatracks are interleaved on the media surfaces 18. The present writing apparatus 10 is appropriate for use with both of these systems.

FIG. 1 also illustrates the major components of the writing apparatus 10. A reference arm 44 is provided which is pivotally moved about a writer pivot axis 46 upon a writer shaft 48 by a positioner 50 (e.g. a VCM or other suitable means). The reference arm 44 has defined therein a generally longitudinal reference arm axis 52. In the preferred embodiment, the actuator pivot axis 28 of the workpiece 12 and the writer pivot axis 46 are placed coaxial for use of the writing apparatus 10.

The writing apparatus 10 may be viewed as having two primary functional sections: a tracking section 54 (FIG. 3) and a measurement section 56 (FIG. 6), each of which functions as a separate feedback controlled loop. A writer controller 58 (FIG. 1) is provided to direct the various operations of the writing apparatus 10 and its communications with the workpiece 12 (communications links 60 are shown in FIG. 1 stylistically depicting the various signal paths from the writer controller 58). Conceptually, the operations of the writing apparatus 10 include: using the tracking section 54 (FIG. 3) to lock the reference arm 44 and the actuator arms 24 of the workpiece 12 into a synchronous movement relationship; using the measurement section 56 (FIG. 6) to determine the position of the reference arm 44; directing the workpiece 12 to position the read-write head 36 as needed, based upon calculations from the determined position; and directing the workpiece 12 to carry out the actual writing of servotrack information. In this manner the writing apparatus 10 assumes the role of master and the workpiece 12 the role of a slave during the process of servotrack writing.

Tracking Section Operation

The major components of the tracking section 54 (FIG. 3) are a laser diode 62, a polarizing plate 64, a polarized tracking beam splitter 66, a tracking retardation plate 68, and a photo sensor 70. In the preferred embodiment all of these are mounted on the reference arm 44 (alternate embodiments are quite possible, and one is discussed below).

Figure 3:
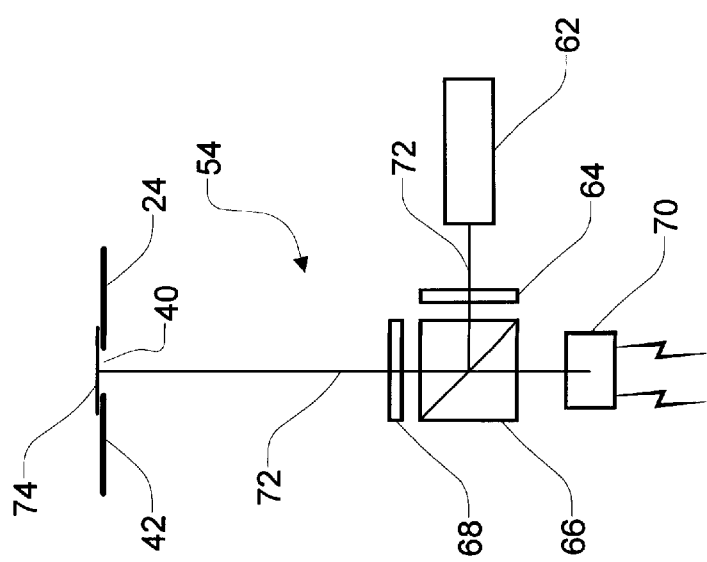
FIG. 3 is a side elevational view of the optical operation of the tracking section of the writing apparatus.

FIG. 3 illustrates in side elevational view the optical operation of the preferred embodiment of the tracking section 54. It should particularly be noted that the reference arm 44 of the writing apparatus 10 and the actuator arm 24 of the workpiece 12 do not make physical contact, a significant difference from many prior art techniques. Instead, the tracking section 54 uses optical techniques. The laser diode 62 emits a light beam 72 directed through the polarizing plate 64 and into the tracking beam splitter 66. The polarizing plate 64 is needed because light emitted by laser diodes is not strongly polarized, and it is desirable to use polarization to control whether the light beam 72 is reflected by or is passed through the tracking beam splitter 66. By suitable initial tailoring of polarization, the light beam 72 is optimally reflected by the tracking beam splitter 66 toward the actuator arm 24 of the workpiece 12, via the tracking retardation plate 68. Portions of the light beam 72 which are incident upon either the media surface 18; the detection region 42; or an added tracking target 74, which has been attached to the actuator arm 24 at the detection region 42 (FIG. 3 depicts the later case), are reflected back toward the tracking beam splitter 66, again via the tracking retardation plate 68. The light beam 72 now having passed twice through the tracking retardation plate 68 (e.g., a conventional ¼ wave plate; well known in the arts of optics and interferometry) is now polarized such that rather than being reflected it passes through the tracking beam splitter 66 into the photo sensor 70. The paths of the light beam 72 as it travels first to the target (e.g., the tracking target 74) and then as it returns from it are preferably made coaxial (i.e., normal). In this manner, the length traveled by the light beam 72 is minimized, and so is any actuator arm 24 variation in perpendicularity which might be translated into radial position signal error.

What the light beam 72 encounters in the workpiece 12 to reflect portions of it may vary in different embodiments of the inventive writing apparatus 10. Numerous scenarios are possible. In one, a part of the light beam 72 passes through the thru-hole 40 of the actuator arm 24 and encounters a media surface 18 (FIG. 1). Since such media surfaces 18 typically exhibit approximately 70% reflectivity, a substantial portion of the light beam 72 is reflected back through the thru-hole 40, and ultimately into the photo sensor 70. Using this, the photo sensor 70 can detect the position of the thru-hole 40. In many respects this technique is similar to that taught in U.S. Pat. No. 5,315,372 by Tsai (one of the present inventors).

However, the inventors have discovered side effects when using such reflection from the media surface 18 itself. As the light beam 72 is reflected, variations in a media surface 18, such as uneven surface and unevenly reflective surface, and variations in the movement of the media surface 18 as it rotates (e.g., vertical run-out, or disk "flutter"), affect the light beam 72 in a manner which is detected by the highly sensitive photo sensor 70. Signal content caused by such variations may be useful for various quality control purposes during workpiece 12 assembly, but here it is unnecessary content which must be prevented from degrading the accuracy of the servotrack writing process. Appropriate signal processing can be performed by the writer controller 58 to deal with this unwanted signal content, but such add expense and complexity to the writing apparatus 10.

Another possible scenario takes advantage of reflection of part of the light beam 72 from the detection region 42 of the actuator arm 24 itself. The position of the thru-hole 40 can be directly detected in this manner, or the edges of the actuator arm 24 at the detection region 42 may even be used (for example if no thru-hole 40 is present). Similar to the first scenario, a returning portion of the light beam 72 is directed to the photo sensor 70 and used to detect the thru-hole 40.

Yet other scenarios use addition of a tracking target 74 to the actuator arm 24. In one variation, the tracking target 74 is placed behind the thru-hole 40 (i.e., on the disk plate 16 side of the actuator arm 24). Much like the first scenario above, the light beam 72 is directed at and passes through the thru-hole 40 of the actuator arm 24. Here also, part of the light beam 72 is reflected back by the tracking target 74 in a manner which the photo sensor 70 is able to detect and which the writing apparatus 10 is thus able to use to infer the position of the thru-hole 40. However, since the tracking target 74 is what reflects the light beam 72, the conditions on the media surface 18 and any movement of the disk plate 16 become irrelevant.

A slight variation of the above scenario is to place the tracking target 74 on the exterior face of the actuator arm 24 (i.e., the side away from the disk plate 16), and to provide on the tracking target 74 a detectable region, say a highly reflective coating in the shape of an oval, which the tracking section 54 can detect. In the preferred embodiment, the tracking target 74 is a simple aluminum coated plastic oblong reflective surface which is attached to the actuator arm 24 with tape. The reflective surface aperture is thus narrow and long, narrow for higher sensitivity and long to increase tolerance to variations in placement of the workpiece 12.

Figure 5:
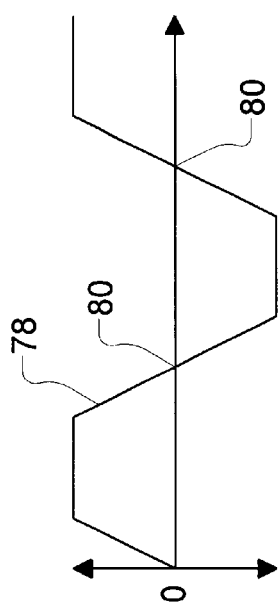
FIG. 5 is a graph depicting a trapezoid shaped modulating waveform for use in the writing apparatus.
Figure 4:
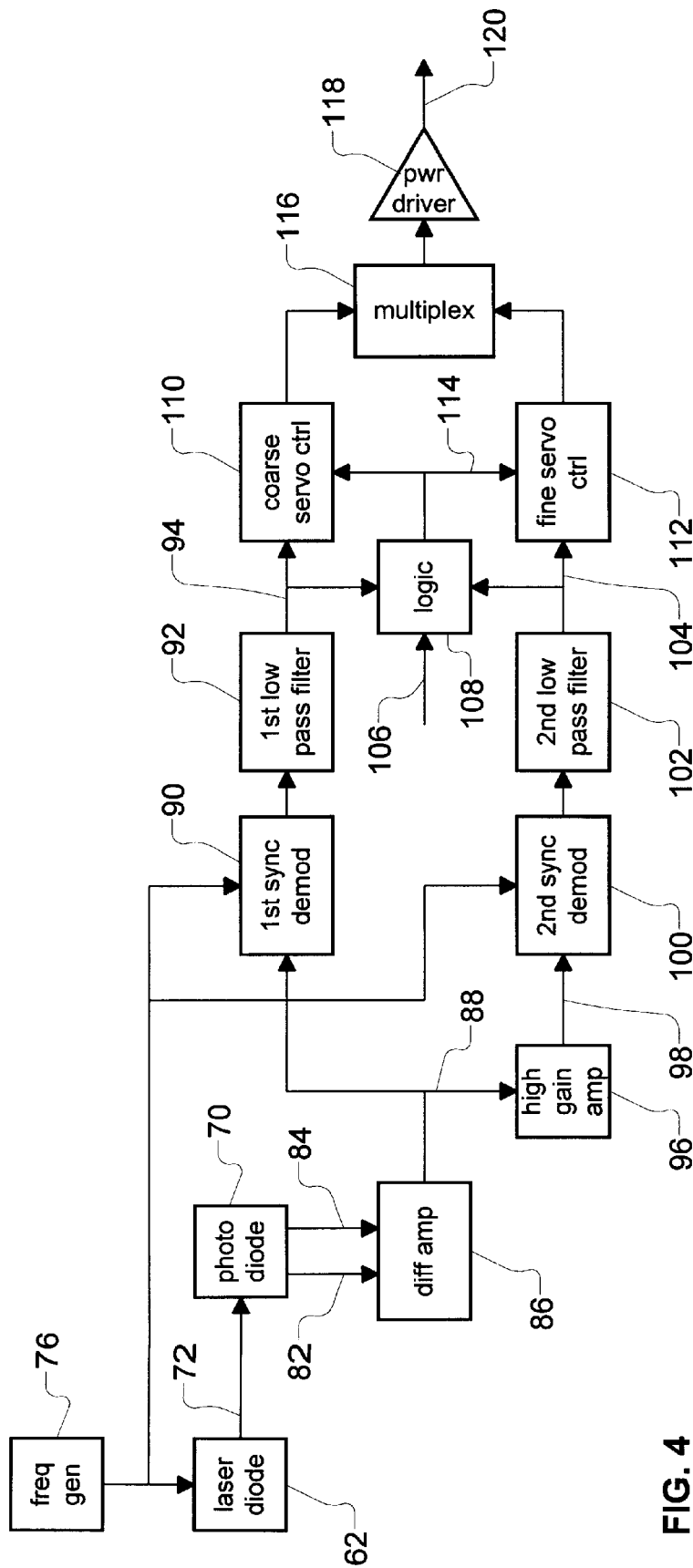
FIG. 4 is a block diagram representation of the signal generation and phase signal processing of the tracking section.

FIG. 4 is a block diagram representation of the signal generation and processing of the tracking section 54. A frequency generator 76 modulates the light beam 72 produced by the laser diode 62 (see also FIG. 1 and FIG. 3). The preferred frequency of modulation is above 30 kHz, to obtain appropriate slave servo bandwidth. Further, the preferred waveform used is shaped to permit a linear transition when crossing zero. FIG. 5 depicts the inventor's preferred waveform shape, a trapezoid modulated wave 78 which is linear at zero crossing points 80, thus making it easy to synchronize to the phase with a synchronous demodulator circuit.

When detected by the two bi-cell portions of the photo sensor 70, the modulated light beam 72 creates a first raw signal 82 and a second raw signal 84. The photo sensor 70 is DC biased, and both the first raw signal 82 and the second raw signal 84 therefore have AC and DC components at this early stage. Unfortunately, the DC component is subject to drift (e.g., of thermal and other types, which is a particular weakness of many present detectors), and the effects of such drift must be eliminated before the high gain amplification used in later stages. To address this, the first raw signal 82 and the second raw signal 84 are fed into a differential amplifier 86 which couples only their AC signal components, and which processes them into a single raw position signal 88.

Part of the raw position signal 88 is processed by a first synchronous demodulator 90 and passed through a first low pass filter 92 to obtain a coarse servo position signal 94. Since the first synchronous demodulator 90 operates directly on the low gain raw position signal 88 high precision demodulation is not required here, and conventional analog switches and operational amplifiers may be used.

Another part of the raw position signal 88 is amplified with a high gain amplifier 96 to produce a highly amplified signal 98. In the preferred embodiment, an operational amplifier configured as an inverting amplifier is used for the high gain amplifier 96, to provide a gain of 500 and to thereby obtain writing apparatus 10 sensitivity in the nanometer range. This permits the inventive writing apparatus 10 to write at track densities above 8,000 tpi. The highly amplified signal 98 is processed by a second synchronous demodulator 100, and is passed through a second low pass filter 102 to obtain a fine servo position signal 104. The second synchronous demodulator 100 must be of high precision, due to the nature of the highly amplified signal 98.

In the preferred embodiment the second synchronous demodulator 100 and the second low pass filter 102 are combined in a board level lock-in amplifier system which serves as a high quality balanced demodulator and a 6th order high quality filter. This component is a "Lock-in Engine" which is commercially available from Quanta Physik, Inc. of Palm Beach Gardens, Fla., U.S.A. ("The lock-in amplifier is basically a synchronous demodulator followed by a low pass filter." "Lock-in amplification is a technique which is used to separate small, narrow band signal content from interfering noise. The lock-in amplifier acts as a detector and narrow band filter combined. Very small signals can be detected in the presence of large amounts of non-correlated noise when the frequency and phase of the desired signals are known." From AD630 Application Note by Analog Devices, Inc. of Norwood, Mass. Quanta Physik's Lock-in Engine is built around the AD630 component.)

The coarse servo position signal 94, the fine servo position signal 104, and an outside mode command 106 are all fed into a logic block 108, where level detectors are employed to generate level dependent position information. A coarse servo position control 110 is provided which contains a normal second order position servo compensating circuit. Similarly a fine servo position control 112 is provided, which contains second order fine position servo compensating circuitry. The logic block 108 controls these with a logic signal 114. When directed by the mode command 106, a multiplexer 116 applies the output of the proper servo loop for given situations into a power driver 118, thereby producing a workpiece control signal 120 which directs operation of the workpiece controller 34.

Since the actuator arm 24 and the reference arm 44 must be brought into synchronization, an initial lock-on operation is needed. In the preferred embodiment the reference arm 44 is placed near the mid-point of its expected range of travel, and the actuator arm 24 is progressively moved from an outside position toward the innermost track position on the disk plate 16. During this movement the photo sensor 70 sequentially detects the shiny media surface 18, the opaque detection region 42 of the actuator arm 24, and finally either the media surface 18 again (through the thru-hole 40 or at the other edge of the actuator arm 24) or else the tracking target 74 if one is used. Thus, whichever type of target is used, lock-on involves a sequence of light beam 72 reflection, no-reflection, then reflection-again, thus enabling servo locking of the actuator arm 24 to the reference arm 44 and avoiding possible false locking. Additional preferred procedure during initial lock-on includes first locking in coarse mode, so that the raw position signal 88 is sufficiently small that the high gain amplifier 96 is able to provide a good signal to the second synchronous demodulator 100 and thereby produce a lockable fine servo position signal 104. This easy method makes it possible to avoid difficulties while locking onto the high sensitivity narrow locking range desired.

Measurement Section

The preferred embodiment of the measurement section 56 uses differential measurement of movement of the reference arm 44. This provides two key benefits. The first is that measurement errors due to eccentricity of a particular measurement target are minimized, thereby achieving higher possible track density. An example of such target eccentricity is run-out of the writer shaft 48. Such run-out can cause repeating and non-repeating changes in the radial distance from the writer pivot axis 46 to other components of the measurement section 56. With differential measurement, any such eccentricity errors which are present get nulled out.

The second key benefit is that differential measurement permits doubled measurement resolution. The use of differential techniques measurement for resolution doubling is conventional in the art of interferometric measurement, and accordingly will not be discussed extensively here. It should also be noted that dual frequency interferometry could be employed with the present invention, to produce even further resolution enhancement. However, this optional technique is not shown or described further herein. This is done for clarity in presenting the underlying principles of the present invention, and because it would be an obvious extension of the spirit of the invention, and one which once pointed out, as has now been done, is well within the grasp of skilled practitioners of the related arts.

Figure 6:
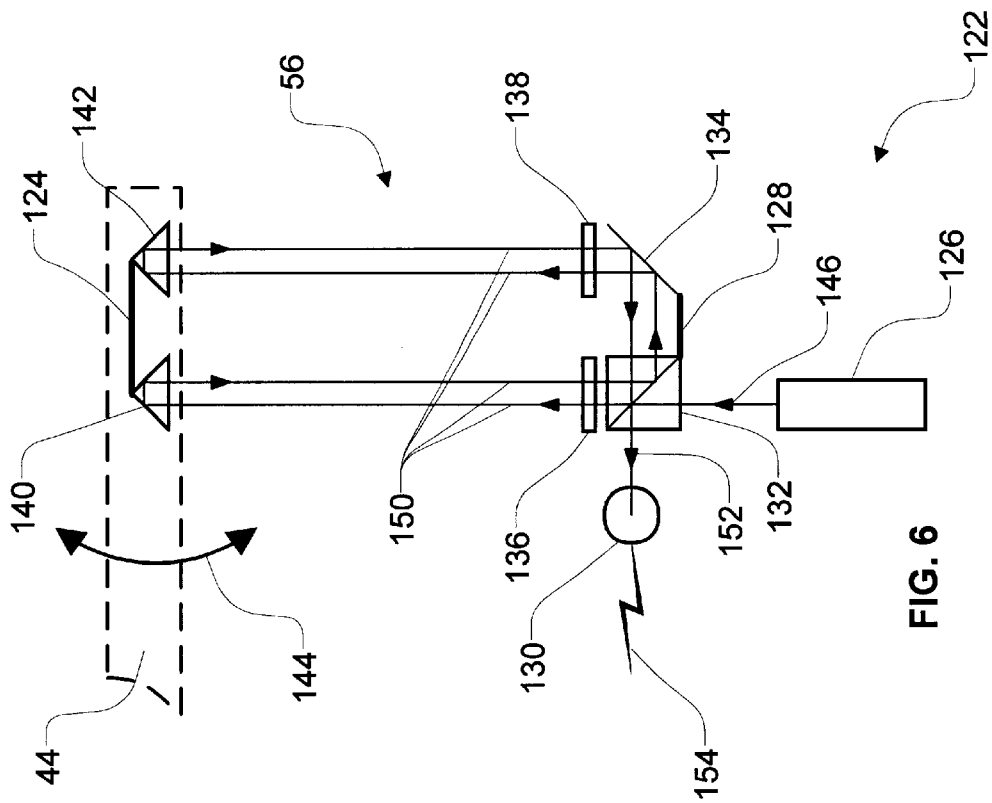
FIG. 6 is a top plan view of the optical operation of the measurement section of the writing apparatus.

In addition to components discussed previously, because they were common to multiple sections, such as the reference arm 44 and the writer controller 58, the measurement section 56 further includes a differential interferometer system 122 and a differential target 124. FIG. 1 presents these in side elevational view, with the interferometer system 122 stylistically rotated into the plane of the side elevational view therein. FIG. 6 in top plan view particularly depicts the optical operation of the measurement section 56. It should be particularly noted that in actual operation the interferometer system 122 would be aligned much as is depicted in FIG. 6, not as in FIG. 1.

The preferred interferometer system 122 includes a laser source 126, a differential head 128, and a detector 130. The differential head 128 includes a polarized measurement beam splitter 132 and a surface reflector 134, which are mounted in a fixed relationship with each other and with a first measurement retardation plate 136 and a second measurement retardation plate 138. The differential target 124 includes a first retro-reflector 140 and a second retro-reflector 142, also mounted in a fixed relationship. The laser source 126, the differential head 128, and the detector 130 are mounted at stable positions, while the differential head 128 is mounted upon the movable reference arm 44. An arc 144 is shown in FIG. 6 depicting movement which the reference arm 44 can be expected to impart to the differential target 124.

In operation, the laser source 126 emits a source beam 146 directed into the measurement beam splitter 132. Due to its initial polarization, the source beam 146 is split into two parts at the measurement beam splitter 132: a reflected reference beam 148, and a transmitted target beam 150. During proper operation of the writing apparatus 10, the reference beam 148 has a very short path, and hence it is not shown in the figures. In contrast, the transmitted target beam 150 travels a long and complex path. (Throughout FIG. 6, arrow-heads are used extensively on the paths of the various beams, to assist viewers in following the complex optical paths present.)

The transmitted target beam 150 passes from the measurement beam splitter 132 through the first measurement retardation plate 136 (e.g. a quarter-wave plate), then passes to the first retro-reflector 140, then is reflected back through the first measurement retardation plate 136 a second time, and then arrives again at the measurement beam splitter 132. Due to the two passes through the first measurement retardation plate 136, the target beam 150 is now suitably polarized so that it is reflected by the measurement beam splitter 132 onto the surface reflector 134. From the surface reflector 134, the target beam 150 then passes through the second measurement retardation plate 138, then it travels to the second retro-reflector 142, then it is reflected back through the second measurement retardation plate 138 a second time, and then it arrives again at the surface reflector 134. At the surface reflector 134 the target beam 150 is again reflected, this time so that it again enters the measurement beam splitter 132. However, due to now also having made two passes through the second measurement retardation plate 138, the polarization of the target beam 150 is such that it passes through the measurement beam splitter 132, causing it to rejoin with the reference beam 148 and form a measurement beam 152. Interference occurs between the reference beam 148 and the target beam 150 when they rejoin, and that produces desirable signal components in the measurement beam 152 which can be detected at the detector 130.

The signal components present in the measurement beam 152 include the frequency components of the original source beam 146, as well as beat frequency components produced by the interference of the reference beam 148 and the target beam 150. The interference effects produced change as the differential target 124 is moved (i.e., as the length of the path of the target beam 150 changes and affects the phase relationship of the interfering beams). The detector 130 is used to detect changes in the interference generated signal components in the measurement beam 152 and to thereby produce a measurement signal 154.

The writer controller 58 is able to calculate displacement of the differential target 124 from the measurement signal 154, and thus also to infer any displacement of the reference arm 44. Applying this displacement information, the writing apparatus 10 is able to assume the role of master in a servo loop and to very precisely control the actuator 30 as its slave, to place the actuator arm 24 and its associated read-write head 36 of the workpiece 12 where desired while servotrack writing is performed.

An Alternate Embodiment

The light beam 72 used in the tracking section 54 does not necessarily have to come from a separate component, such as the laser diode 62 in FIG. 1. Instead, the laser source 126 in the measurement section 56 can be used as a source here also. Typically, if dual frequency interferometry were used, the laser source 126 used would be a HeNe laser having a frequency split of around 2 MHz. This frequency can be used as a modulating frequency (i.e., in place of the frequency generator 76), with the only problem being handling of the relatively higher modulating frequency. There are a few higher frequency balanced modulators and demodulators currently available, and the use of such, together with a wide bandwidth differential amplifier 86 and a higher frequency high gain amplifier 96, permits the same inventive technique to be used to synchronously demodulate the raw position signal 88 and achieve equivalent results to those of the first embodiment, described above.

Changes required in the optics to implement this alternate embodiment include replacement of the laser diode 62 with a beam bender, and placing an additional beam splitter in the path of laser source 126. A portion of the source beam 146 is then directed into the beam bender and from there onward for use in the tracking section 54 in the manner already discussed above.

In addition to the above mentioned examples, various other modifications and alterations of the writing apparatus 10 may be made without departing from the invention. Accordingly, the above disclosure is not to be considered as limiting and the appended claims are to be interpreted as encompassing the entire spirit and scope of the invention.

Industrial Applicability

The present servotrack writing apparatus 10 is well suited for application in the assembly of computer storage media such as hard disk drives. In the disk drive industry the ultimate workpiece 12 storage density is ultimately limited by the accuracy of the position references provided inside the drives for use to write and to read user data (i.e., datatracks). Servotracks are the positional references used, and to date the industry has had considerable difficulty writing them in manufacturing environments at densities exceeding 8,000 tracks per inch ("tpi"). The present servotrack writing apparatus 10 is easily capable of 10,000 tpi, and that can be improved upon considerably by using conventional industry resolution enhancement techniques, such as multiple frequency interferometry and differential nulling of errors. Accordingly, the present writing apparatus 10 permits the industry to provide disk drives having much increased storage capacity.

The present servotrack writing apparatus 10 also permits increased speed of disk drive assembly, which accordingly reduces the manufacturing costs of disk drives. Part of the increased resolution supplied by the invention may be used as increased tolerance, thereby permitting less critical workpiece 12 mounting during the assembly step when servotrack writing is performed. Further, since the writing apparatus 10 works well with differential measurement techniques, the effects of some types of errors can be nulled out (e.g., writing apparatus 10 eccentricity, and writing apparatus 10 to workpiece 12 alignment), and accordingly less attention need be given to the presence of such error sources. The present writing apparatus 10 does not require use of the considerable resources which prior art systems have to apply to mounting workpieces 12 without appreciable eccentricity or misalignment, particularly as high track densities are attempted.

For the above, and other, reasons, it is expected that the writing apparatus 10 of the present invention will have widespread industrial applicability. Therefore, it is expected that the commercial utility of the present invention will be extensive and long lasting.

We claim:

1. A positioning apparatus for positioning a read-write head and an associated actuator arm over a media surface in a disk drive workpiece, the positioning apparatus comprising:

a reference arm;

moving means for moving said reference arm;

measuring means for determining position of said reference arm;

relationship determining means for determining position of the actuator arm of the workpiece relative to said reference arm;

said relationship determining means including a light source producing a light beam, a sensor producing a signal when a reflected portion of said light beam reaches said sensor, and phase sensitive detection means for applying phase sensitive synchronous demodulation to said signal such that position of the actuator arm of the workpiece relative to said reference arm is determined; and control means for directing the positioning apparatus as a master and directing the workpiece as a slave to lock and move the actuator arm of the workpiece in a synchronous relationship with said reference arm of the positioning apparatus based upon feedback from said relationship determining means, and for directing said moving means to position said reference arm based upon feedback from said measuring means.

2. The positioning apparatus of claim 1, wherein:

said reference arm has defined therein a master longitudinal axis;

the actuator arm has defined therein a slave longitudinal axis;

said reference arm pivotally moves about a master pivotal axis;

the actuator arm pivotally moves about a slave pivotal axis; and said master longitudinal axis and said slave longitudinal axis are parallel, and said master pivotal axis and said slave pivotal axis are coaxial, when said reference arm of the positioning apparatus and the actuator arm of the workpiece are moved in said synchronous relationship.

3. The positioning apparatus of claim 1, wherein:

said measuring means of the positioning apparatus includes a laser interferometer system.

4. The positioning apparatus of claim 3, wherein:

said laser interferometer system differentially measures the position of said reference arm, to increase measurement resolution and to null errors with differential cancellation.

5. The positioning apparatus of claim 3, wherein:

said laser interferometer system uses multiple frequency interferometry, to increase measurement resolution.

6. The positioning apparatus of claim 1, wherein:

the actuator arm of the workpiece has a thru-hole; and said reflected portion of said light beam of said relationship determining means passes through said thru-hole and is reflected from the media surface of the workpiece back through said thru-hole and into said sensor for said control means of the positioning apparatus to determine positioning of said thru-hole and to infer positioning of the actuator arm from which said control means then creates and maintains said synchronous relationship between said reference arm of the positioning apparatus and the actuator arm of the workpiece.

7. The positioning apparatus of claim 1, wherein:

the actuator arm of the workpiece has a thru-hole;

a detection region is defined surrounding said thru-hole on the actuator arm; and said reflected portion of said light beam of said relationship determining means is reflected from said detection region into said sensor for said control means of the positioning apparatus to determine positioning of said thru-hole and to infer positioning of the actuator arm from which said control means then creates and maintains said synchronous relationship between said reference arm of the positioning apparatus and the actuator arm of the workpiece.

8. The positioning apparatus of claim 1, wherein:

a detection region is defined which includes an edge of the actuator arm; and said reflected portion of said light beam of said relationship determining means is reflected from said detection region into said sensor for said control means of the positioning apparatus to determine positioning of said edge and to infer positioning of the actuator arm from which said control means then creates and maintains said synchronous relationship between said reference arm of the positioning apparatus and the actuator arm of the workpiece.

9. The positioning apparatus of claim 1, wherein:

a detection target is affixed onto the actuator arm; and said reflected portion of said light beam of said relationship determining means is reflected from said detection target into said sensor for said control means of the positioning apparatus to determine positioning of said detection target and to infer positioning of the actuator arm from which said control means then creates and maintains said synchronous relationship between said reference arm of the positioning apparatus and the actuator arm of the workpiece.

10. The positioning apparatus of claim 9, wherein:

the actuator arm of the workpiece has a thru-hole;

said detection target is affixed onto the actuator arm behind said thru-hole; and said reflected portion of said light beam of said relationship determining means passes through said thru-hole and is reflected from said detection target back through said thru-hole and into said sensor for said control means of the positioning apparatus to determine positioning of said thru-hole and to infer positioning of the actuator arm.

11. The positioning apparatus of claim 1, wherein:

said sensor of the positioning apparatus includes a bi-cell photo diode detector.

12. The positioning apparatus of claim 1, wherein:

said relationship determining means of the positioning apparatus uses a modulation frequency of at least 30 kilohertz, to obtain suitable bandwidth so that the positioning apparatus can resolve high track densities of positions assumable by the actuator arm over the media surface in the workpiece.

13. The positioning apparatus of claim 1, wherein:

said relationship determining means of the positioning apparatus uses a modulation signal waveform which is linear when crossing zero, to facilitate demodulation in said control means by locking to phase content of said modulation signal waveform.

14. The positioning apparatus of claim 13, wherein:

said modulation signal waveform has a trapezoid shape.

15. The positioning apparatus of claim 1, wherein:

said phase sensitive detection means of the positioning apparatus includes a lock-in amplifier, to perform synchronous demodulation and low pass filtering of said signal.

16. The positioning apparatus of claim 1, wherein:

said control means of the positioning apparatus provides a plurality of resolutions in said synchronous relationship between said reference arm of the positioning apparatus and the actuator arm of the workpiece, to permit varying degrees of coarseness and fineness of synchronized movement in said synchronous relationship and to facilitate initial creation of said synchronous relationship.

17. The positioning apparatus of claim 1, wherein:

said relationship determining means of the positioning apparatus includes modulating means for modulating said light beam;

said sensor of the positioning apparatus includes a bi-cell detector, to detect modulated light from said light source and to thereby generate said signal as a pair of raw signals; and said phase sensitive detection means of the positioning apparatus includes:

a differential amplifier, to convert said pair of raw signals into a position signal; and coarse signal processing means to coarsely maintain said synchronous relationship based upon said position signal; and fine signal processing means to finely maintain said synchronous relationship based upon said position signal, wherein said fine signal processing means includes a lock-in amplifier, to perform synchronous demodulation and low pass filtering of said position signal.

18. An improved positioning apparatus for writing servotracks in a disk drive workpiece, wherein:

the workpiece includes a media surface and a read-write head mounted on an associated actuator arm which moves over the media surface; and the positioning apparatus is of the type having:
a movable reference arm,
a measuring means for determining positioning of the reference arm, and
control means which moves the reference arm, operates the measuring means, and directs the workpiece to position the actuator arm and to write servotracks with the read-write head in the media surface;

the improvement comprising:
a relationship determining means for detecting the position of the actuator arm of the workpiece and for maintaining a synchronized movement relationship between the actuator arm and the reference arm of the positioning apparatus, wherein said relationship determining means does not contact the actuator arm of the workpiece and said relationship determining means includes a light source producing a light beam, a sensor producing a signal when a reflected portion of said light beam reaches said sensor, and phase sensitive detection means for applying phase sensitive synchronous demodulation to said signal such that position of the actuator arm of the workpiece relative to said reference arm is determined, to thereby obtain increased precision in said synchronized movement relationship.

19. The improved positioning apparatus of claim 18, wherein:

said relationship determining means includes modulating means for modulating a light source;

said sensor includes a bi-cell detector, to detect modulated light from said light source and to thereby generate said signal as a pair of raw signals; and said phase sensitive detection means includes signal processing means for producing from said pair of raw signals a servo signal to maintain said synchronized movement relationship, wherein said signal processing means includes a lock-in amplifier, to perform synchronous demodulation and low pass filtering of said position signal.

20. A writing process for writing servotracks in a computer storage workpiece having a read-write head and an associated actuator arm movable over a media surface, the process comprising:

locking the actuator arm into a non-contact synchronous movement relationship with a reference arm;

measuring positional data regarding said reference arm;

positioning the actuator arm in said synchronous movement relationship based upon said positional data;

writing the servotracks in the media surface of the workpiece by directing a light beam at the actuator arm of the workpiece such that a reflected beam is created;

detecting said reflected beam with a sensor to produce a reflection signal; and processing said reflection signal using phase sensitive synchronous demodulation, to thereby increase the precision of said synchronous movement relationship and write the servotracks more accurately and in higher density on the media surface of the workpiece.

* * * * *